United States Patent [19] [11] 3,966,500
Brixy [45] June 29, 1976

[54] TEMPERATURE-MEASURING DEVICE
[75] Inventor: Heinz Brixy, Julich, Germany
[73] Assignee: Kernforschungsanlage Julich Gesellschaft mit beschrankter Haftung, Julich, Germany
[22] Filed: Apr. 22, 1974
[21] Appl. No.: 463,104

Related U.S. Application Data
[63] Continuation-in-part of Ser. No. 428,352, Dec. 26, 1973.

[30] Foreign Application Priority Data
Apr. 25, 1973 Germany............................ 2320751

[52] U.S. Cl............................. 136/232; 73/359 R; 73/362 AR; 136/227; 136/233; 338/28; 338/30
[51] Int. Cl.² ....................... G01K 7/30; G01K 7/04
[58] Field of Search ...................... 73/359, 362 AR; 136/233, 227, 232; 338/26, 28, 30; 324/71 R

[56] References Cited
UNITED STATES PATENTS
| | | | |
|---|---|---|---|
| 2,370,326 | 2/1945 | Ray | 136/227 X |
| 2,742,756 | 4/1956 | De Boisblanc | 324/71 R X |
| 2,768,266 | 10/1956 | Marsden | 73/359 X |
| 2,805,272 | 9/1957 | Postal | 136/228 |
| 2,820,945 | 1/1958 | Marsden | 324/71 R X |
| 3,307,401 | 3/1967 | Bachman | 73/359 |
| 3,513,432 | 5/1970 | Davis | 338/28 |

FOREIGN PATENTS OR APPLICATIONS
272,609   9/1970   U.S.S.R.............................. 73/359

Primary Examiner—Jerry W. Myracle
Assistant Examiner—Frederick Shoon
Attorney, Agent, or Firm—Karl F. Ross; Herbert Dubno

[57] ABSTRACT

A temperature-measuring device has an elongated tubular housing in one of whose closed ends is received a noise-temperature resistor having at least one side connected via a wire constituting a thermocouple element to a lead connected to temperature-measuring apparatus. The other side of the noise-temperature resistor is connected to the tubular housing which therefore constitutes the other element within the housing and connected via leads to apparatus without the housing. The thermocouple element or elements may extend from the noise-temperature resistor outside the housing, or may be wholly contained within the housing and connected via a pair of leads to apparatus outside the housing.

3 Claims, 7 Drawing Figures

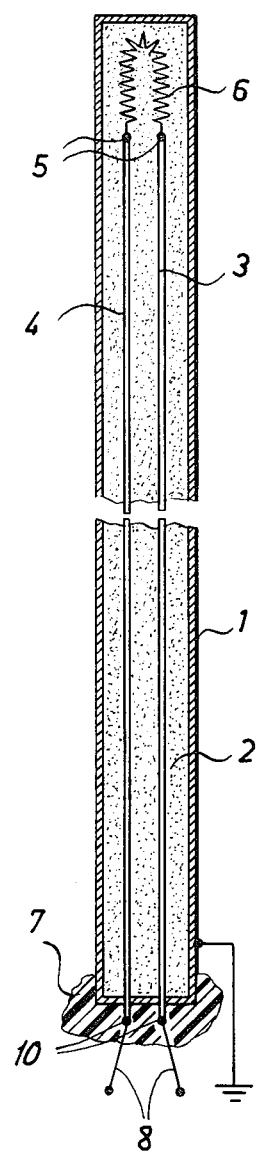
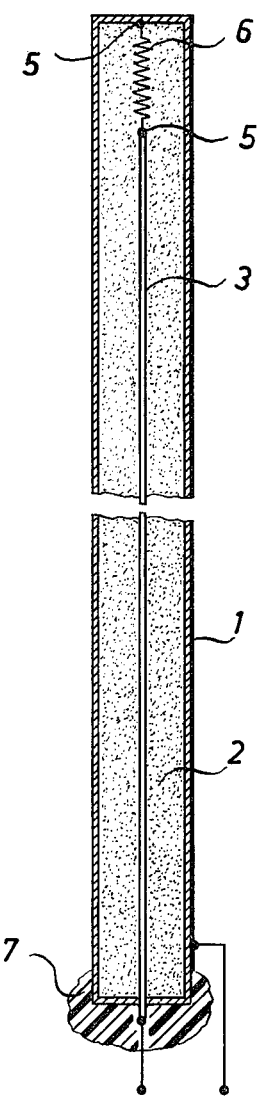

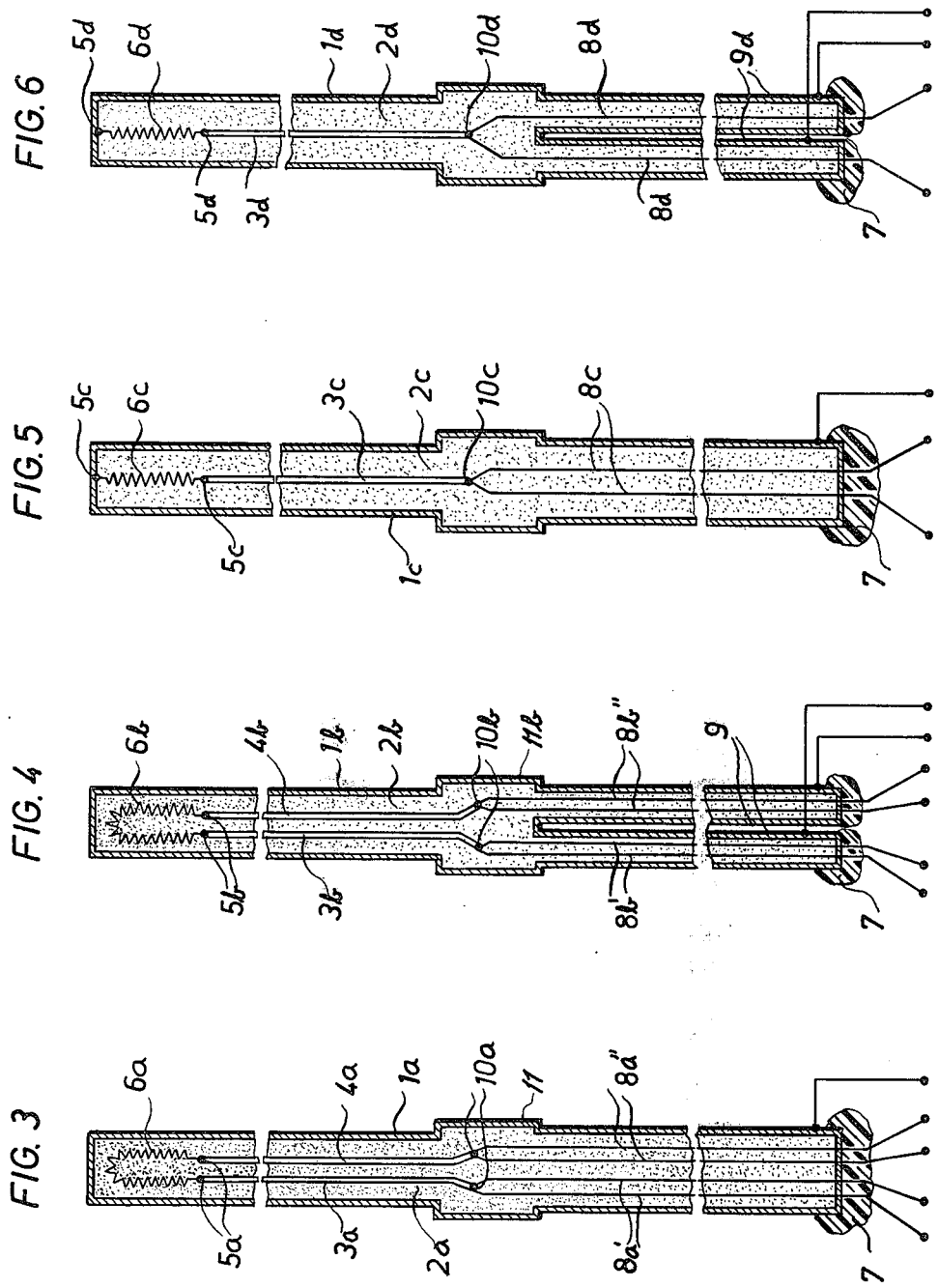

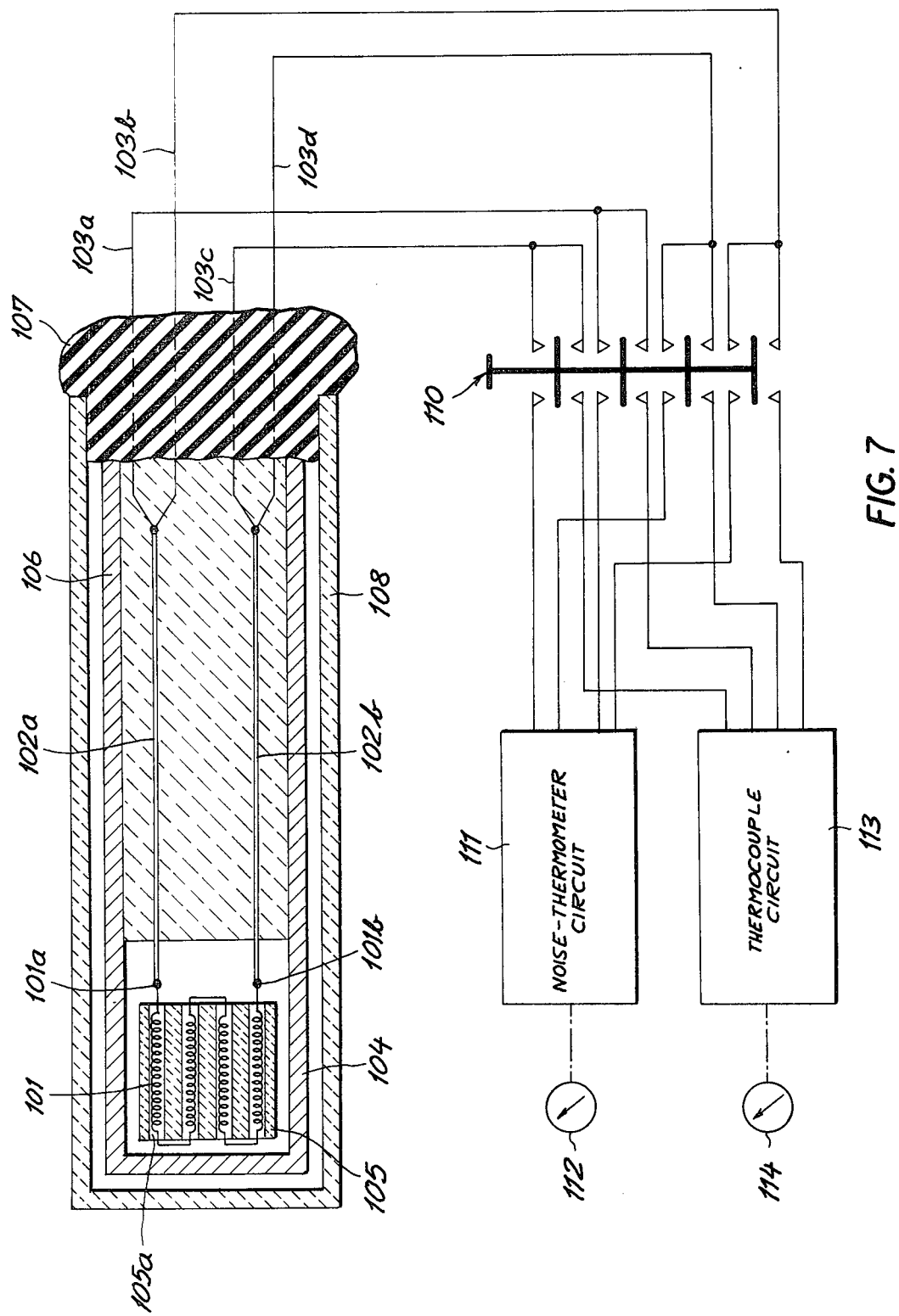

TEMPERATURE-MEASURING DEVICE

CROSS-REFERENCE TO RELATED APPLICATIONS

The present application is a continuation in part of our application Ser. No. 428,352 filed on 26 Dec. 1973 and is related to the commonly owned copending applications Ser. Nos. 238,833 (now U.S. Pat. No. 3,818,761) and 238,834, both filed 28 Mar. 1972, and Ser. No. 369,733 filed 13 June 1973.

FIELD OF THE INVENTION

Our present invention relates to a temperature-measuring system and, more particularly, to a system for measuring temperatures over a wide temperature range with greater accuracy than heretofore and utilizing principles of noise-temperature thermometers and thermoelectric temperature-measuring systems.

BACKGROUND OF THE INVENTION

For the measurement of temperatures, especially with electrical or electronic instruments, various basic principles have been employed. For example, it is known to measure temperatures by detecting the potential difference or emf produced by a junction of dissimilar metallic and/or semi-conductive temperature-sensitive elements such as thermocouples or thermopiles. Such systems produce an emf which is a function of temperature and may be used for a wide variety of temperature-measuring purposes.

However, when such thermoelements are employed for the measurement of temperatures above about 1000°C or when the measuring instruments or sensor is to be located in an environment which may be destructive to the sensor, the accuracy of the measurement leaves much to be desired and considerable error is introduced.

Apparently maintaining the dissimilar-metal junction at an elevated temperature for long periods varies the emf per °C which is generated by the system, perhaps as a result of interdiffusion of the metals, diffusion of impurities from a furnace atmosphere into the junction or like changes in the sensor. The prolonged exposure to high temperatures may also effect the leads or conductors. These disadvantages are observed even when the system is enclosed in a ceramic sleeve.

As described in the above-identified applications, it has been proposed to avoid the disadvantages of conventional temperature-sensing systems by providing so-called noise-thermometers which utilize a different principle. A noise-thermometer system utilizes a metallic strand, wire, or film which generates an electrical output by thermal agitation of electrical charges within the conductor. The output is a noise voltage and is produced in the electrical conductor by such thermal agitation. Thermal noise, also known as JOHNSON noise, can be produced in a conductor even at temperatures approaching 0°K at which thermocouples become noticeably less efficient, and may be particularly suitable for the measurement of temperatures in the range of several hundred °K. The available thermal-noise power is proportional to the absolute temperature over the frequency band width over which the noise is measured, as described in the aforementioned applications. With a fixed band width, the available thermal-noise power can be measured in terms of the noise voltage and is proportional to absolute temperature. The theory of such systems and various circuits utilizing the principles of JOHNSON noise and temperature measurement are described in U.S. Pat. Nos. 2,710,899, 2,728,835, 2,768,266 and 2,884,786.

Frequently it is desirable to have available another temperature-measuring instrument with which a thermocouple can be calibrated with the aid of a noise thermometer or vice versa. For this reason two instruments are required and the introduction of both simultaneously to the measurment site may pose a problem. Furthermore, when reference to one and another indicator must be made repeatedly, the problem has been all but insurmountable with conventional systems.

In our earlier application Ser. No. 428,352 we disclosed a system having a single housing and insulating assembly, at least one thermocouple operating with a junction of dissimilar metals, and provided with the usual conductors or leads, a noise-temperature-measuring conductor connected to the leads of the thermocouple and preferably to the latter at its junction and returned by another conductor, and circuit means selectively connecting the thermocouple to a thermocouple temperature-measuring circuit and the noise-temperature sensor to a noise-thermometer circuit.

According to a preferred embodiment of this earlier invention, the noise-temperature sensor is connected at one end to a conductive shell, tube, or housing which encloses both the electrical resistor (noise-temperature sensor) and the thermocouple. Advantageously, two such thermocouples are provided with respective leads, and the noise-temperature-sensing resistor bridges the junctions of these two thermocouples.

Not only does the aforedescribed system provide the individual advantages of a noise thermometer and a thermocouple temperature sensor, but the overall system gives rise to new, useful and unexpected results which have not heretofore been obtainable. For temperature indication without concern for electrical disturbances in the system, the thermocouple is employed to provide an emf which may be rapidly and accurately converted into an indication of the temperature. To achieve this advantage the noise-temperature thermometer is used to calibrate the thermocouple and to check the determination of temperatures when using the thermocouple. The two sensors are so juxtaposed that differences in their operating temperature due to physical separation cannot occur, inasmuch as the noise-thermometer resistor is directly connected to the thermocouple junction.

Since a remote temperature measurement is possible, the parasitic effects resulting from long lengths of conductors can be canceled out or suppressed by utilizing the technique described in the aforementioned applications, especially since two conductors are provided for each thermocouple and may be used alternately to eliminate the variables resulting from such conductors.

The system according to this previous invention thus has the advantage that the two conductors may be used as described in the aforementioned applications to eliminate the resistance effects of the conductors extending to and from the measuring head. The protective tube also forms a shield for the system.

When a single thermocouple is employed and the conductive path to the noise-temperature thermometer is returned through the conductive shell, tube, or shield, the low resistance of the latter also renders the resistance of the return path negligible.

OBJECTS OF THE INVENTION

It is an object of the present invention to advance principles of the earlier applications described above.

Another object is the provision of an improved temperature measuring system.

Yet another object is to provide an improved temperature measuring device which is inexpensive to manufacture and which gives very accurate and reliable temperature data.

SUMMARY OF THE INVENTION

These objects are solved according to the present invention in a system wherein the noise-temperature resistor has one end connected to one of the elements of a thermocouple and another end connected to the other element which is spaced from the one element. It has been surprisingly found that the interposition of such a resistor between the two elements of a thermocouple does not prevent it from functioning.

Such a system is less expensive to manufacture, as the number of parts is reduced. At the same time it has been found that it is possible to obtain considerably more accurate results than has been hitherto possible when, in accordance with another feature of the present invention, one of the elements of the thermocouple is formed as a straight wire whose one end is connected via leads to the measurement circuit and whose other end is connected to one side of the noise-temperature resistor.

According to yet another feature of the invention the other element of the thermocouple is a metallic can surrounding the wirelike thermoelement and the resistor. The wirelike element and the resistor are potted in a ceramic material within this can so as to form a very inexpensive device.

In accordance with a further feature of the present invention both thermoelements are straight wires extending parallel to each other with the resistor bridging their one ends and leads connected to their other ends.

According to a feature of this invention the wire thermoelement or thermoelements extend only part of the length of an elongated housing containing the device. Leads are connected to the element end or ends opposite the resistor and extend out of this housing. Such a housing can be formed according to this invention with a pair of legs in which the two separate output leads for each conductor are received much as in a so-called coaxial cable.

BRIEF DESCRIPTION OF THE DRAWING

The above objects, features, and advantages will become more readily apparent from the following description, reference being made to the accompanying drawing in which:

FIGS. 1–6 are longitudinal sections through devices in accordance with the present invention; and FIG. 7 is an axial cross-sectional view and block diagram illustrating other characteristics of the invention.

SPECIFIC DESCRIPTION

As shown in FIG. 1 a temperature-measuring device comprises a cylindrical outer housing or can 1 made of tungsten and filled with insulating ceramic material in which is provided a pair of thermal elements 3 and 4, the former being constituted in this case of copper and the latter of constantan. These elements 3 and 4 have ends 5 adjacent to the closed end of can 1 and bridged by a noise-temperature resistor 6 of the type described in copending patent application Ser. No. 369,733 or the applications mentioned therein. The other ends 10 of these thermoelements 3 and 4 project from the can 1 into a body 7 of potting material where they are connected to respective leads 8 connected to a circuit such as that shown in the patent application cited immediately above.

The arrangement shown in FIG. 2 is identical to that shown in FIG. 1 except that in this case the can 1 serves as the electrode 4, constituting the low-resistance return path.

In the arrangement shown in FIG. 3 the can 1a is filled with potting material 2a and contains two wire-like electrodes 3a and 4a extending between a central region 11 of increased diameter and an end region where the ends 5a of these elements 3a and 4a are bridged by a noise-temperature resistor 6a as described above. The ends 10a of the elements 3a and 5a are each connected to a pair of conductors 8a' and 8a'' which extend between the central portion 11 of the can 1a and the end received in the potting compound 7. These leads 8a' and 8a'' are connected to measuring circuits as will be described hereinafter.

The arrangement of FIG. 4 has a can 1b formed with a thickened central region 11b and a pair of legs 9 extending from this region 11b and each housing coaxially a pair of leads 8b' and 8b'' extending from ends 10b of elements 3b and 4b potted in ceramic material 2 and having ends 5b bridged by resistor 6d and the outside of the device.

In FIG. 5 the tubular housing 1c serves as the thermal element 4 and the other thermal element 3c has its one end tightly connected to the noise-temperature resistor 6c to a point 5c at the one of the can 1c and has another end 10c connected via a pair of electrodes 8c to circuitry as described below.

FIG. 6 is substantially similar to FIG. 5, with a central wire-like element 3d having its one end 5d connected via a noise-temperature resistor 6d to a point 5d at the closed end of a housing 1d containing a mass of ceramic material 2. The other end 10d of the wire 3d is connected via a pair of leads 8d each received in a respective independent cylindrical leg 9d of the housing 1d.

FIG. 7 shows a system of the type described with reference to FIG. 4 in more detail. From this embodiment it will be apparent that the tube 105 within the sheath 104 is formed with a plurality of channels 105a in which the coiled resistance wire 101 passes in a meander in alternately opposite axial directions. Thus a consierable length of noise-thermometer wire may be incorporated in the resistor 101 in a very limited space. One terminal 101a of the resistance wire is soldered to the iron wire 102a of an iron-constantan or other thermocouple whose leads 103a and 103b extend through the ceramic insulating body 106 and the insulating potting compound 107, which retains the assembly in a ceramic tube 108. The other terminal 101b of the noise-temperature thermometer is connected to the constantan wire 102b whose leads 103c and 103d likewise extend out of the system.

A switch 110 has its contacts arranged to connect the leads of the thermocouples to the noise-thermometer circuit 111 (see application Ser. No. 369,733) whose output may be read from a temperature-display device represented diagrammatically at 112.

In the other position of witch 110, both leads of each thermocouple are connected to the thermocouple circuit 113 whose temperature-display device is shown at 114. The thermocouple circuit may be of the type described at Chapter 25, pp. 10 ff. of Perry's Chemical Engineers' Handbook, McGraw-Hill Book Co. 1963, while the thermocouples may be of the type described at pp. 22 – 6 ff. thereof.

We claim:
1. A temperature-measuring device comprising:
an elongated housing having a closed end;
a body of refractory material in said housing;
a noise-thermometer coil in said housing adjacent said closed end and having a pair of opposite extremities;
a pair of spaced-apart thermocouple elements extending through said body and each forming a thermocouple junction with said noise-thermometer coil at a respective extremity thereof, said elements being of materials which are capable of forming a temperature-measuring thermocouple junction with one another; and
two pairs of pair of conductors, each conductor being connected to one of said elements remote from the junctions thereof with said extremities and leading from said housing.

2. The device defined in claim 1 wherein each of said elements is a straight wire.

3. The device defined in claim 2 wherein said housing has a pair of parallel hollow legs, each pair of conductors extending through a respective one of said legs.

* * * * *